(12) United States Patent  (10) Patent No.: US 8,813,890 B2
Terry  (45) Date of Patent: Aug. 26, 2014

(54) TRICYCLE LIFTING SUSPENSION TRANSPORTER

(71) Applicant: Intelliport Corporation, Mount Vernon, WA (US)

(72) Inventor: Melvin Dean Terry, Mount Vernon, WA (US)

(73) Assignee: Intelliport Corporation, Mount Vernon, WA (US)

( * ) Notice: Subject to any disclaimer, the term of this patent is extended or adjusted under 35 U.S.C. 154(b) by 0 days.

(21) Appl. No.: 13/661,474

(22) Filed: Oct. 26, 2012

(65) Prior Publication Data

US 2014/0119862 A1    May 1, 2014

(51) Int. Cl.
  *B62D 61/06*    (2006.01)
  *B60K 1/00*    (2006.01)
  *B60K 1/02*    (2006.01)

(52) U.S. Cl.
  CPC .... *B60K 1/02* (2013.01); *B60K 1/00* (2013.01)
  USPC ......................................... 180/214; 180/264

(58) Field of Classification Search
  CPC ........ B62D 57/00; B62D 61/10; B62D 7/144; D62D 11/02; B60K 1/00; B60K 1/02
  USPC ............ 180/21, 22, 24, 24.07, 7.1, 264, 6.48, 180/212, 213, 214
  See application file for complete search history.

(56) References Cited

U.S. PATENT DOCUMENTS

| 4,164,664 | A | 8/1979 | Kasiewicz |
| 4,886,285 | A | 12/1989 | Horbach et al. |
| 5,231,583 | A | 7/1993 | Lizell |
| 5,379,842 | A | 1/1995 | Terry |
| 5,624,004 | A | 4/1997 | Watanabe |
| 6,050,355 | A | 4/2000 | Beck, Jr. |
| 6,461,267 | B1 | 10/2002 | Paielli |
| 7,093,383 | B2 | 8/2006 | Mennen et al. |
| 7,234,386 | B2 | 6/2007 | Schedgick et al. |
| 7,296,643 | B2 | 11/2007 | Philipson |
| 7,950,478 | B2 | 5/2011 | Terry |
| 2011/0094815 | A1 | 4/2011 | Terry |

*Primary Examiner* — Tony Winner

(57) ABSTRACT

A self-loading tricycle transporter directed to 10-50 ton load ranges having a three-point tricycle type configuration providing superior suspension in terms of natural load contact on any type of surface condition. The tricycle transporter includes a fluid lifting suspension at each of three points. One point utilizes an on-center rotation fluid suspension axle assembly working in conjunction with solid elastomer tires at each end axle beam at the rear that attaches to the underside of the tricycle transporter platform with heavy fluid cylinder at each end. Accordingly, the three suspension points have the capability of being able to lift and lower to accommodate self-loading.

10 Claims, 6 Drawing Sheets

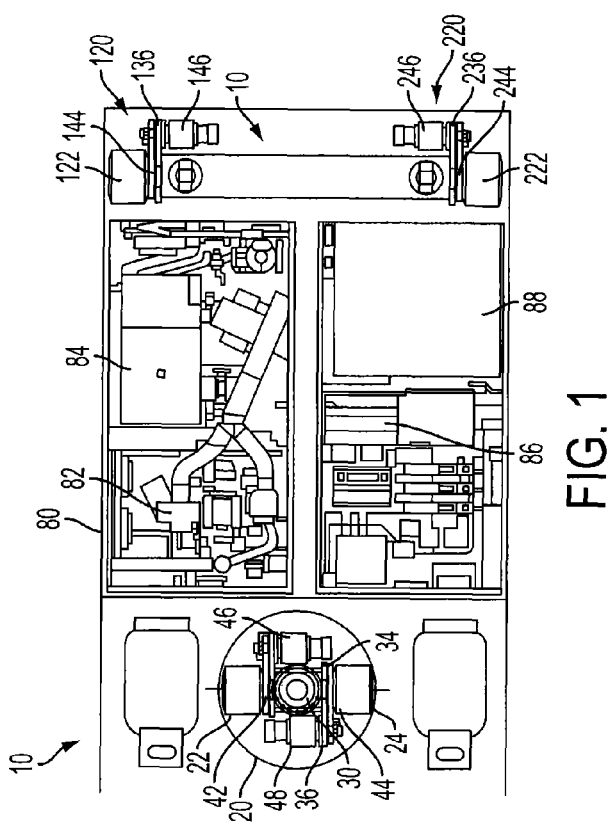
FIG. 1
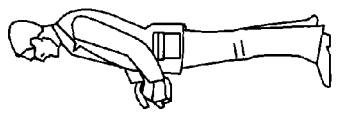
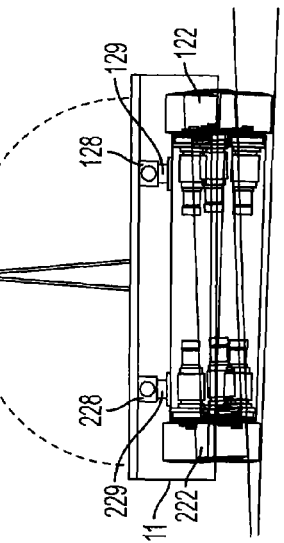
FIG. 3
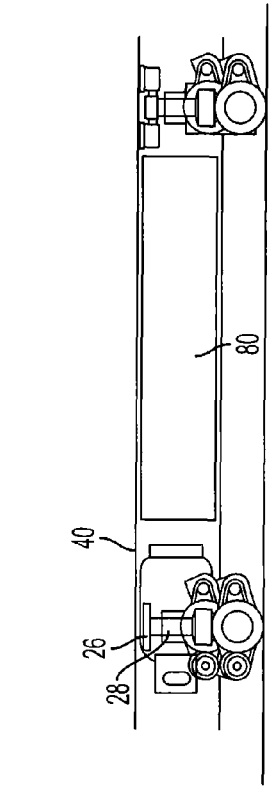
FIG. 2

TRICYCLE LIFTING SUSPENSION TRANSPORTER

BACKGROUND

1. Field

The present disclosure relates to a tricycle transporter having two or more fluid suspension axle assemblies in order to carry very heavy loads. More particularly, the present disclosure relates to a tricycle transporter having two arrangements of axle assemblies that have both dependent and independent suspension, and is capable of self-loading in order to carry very heavy loads without damaging the transport surface.

2. Description of the Related Art

Industrial facilities, including factories, power plants and shipyards, often require that very large, heavy and often delicate objects be moved both within buildings of the industrial facility and between buildings.

One method in which very heavy objects can be moved within an industrial facility is through the use of cranes. One example of a crane used in an industrial facility is a gantry crane which includes a hoist in a trolley running horizontally along gantry rails. The gantry crane has the disadvantages of a large size, especially height, and a lack of maneuverability. Another example of a crane used in an industrial facility is an overhead crane system including beams mounted on the side walls of a building. In the overhead crane system, the hoist is on a trolley which moves along the beams. A disadvantage of the overhead crane is that objects cannot be transported from one bay to another or outside of the building beyond which the overhead crane's track system extends.

Another method of moving objects within an industrial facility is through the use very heavy capacity fork lifts and heavy capacity trailers, both of which require extended operating space and place heavy point-loading on the operating surfaces.

Heavy capacity fork lifts typically have solid, or limited mechanically equalizing suspension relying on compression of the tires for compliance to uneven operating surfaces. Very heavy capacity solid tire trailers are limited to mechanical equalizing suspension, therefore providing limited compliance and maneuverability on irregular floors and congested spaces. The latter have sharply diminishing capabilities for loads above 40 tons.

For the transport of very heavy loads within an industrial facility—, where loads are generally in excess of 80 tons, In Plant—Self-Propelled Modular Transporters (IP-SPMT) may be utilized. An IP-SPMT refers to a low-profile deck, multi-axle, self-propelled transporter, with independent-fluid suspension axle assemblies that are typically used to carry loads heavier than 40 tons and ranging into hundreds of tons. An IP-SPMT is typically internal combustion engine-electric powered and has four to twelve or more on-center rotation axle assemblies. The on-center rotation axles can be independently steered by varying each wheel motor speed and direction.

Another method of moving heavy objects within an industrial facility are air bearings which have the capability of self-loading and omni-directional movement, including their inherent ability to lift for independent equalized load sharing across any number of support points; however, that technology is sharply restricted by the surface texture, smoothness, and uninterrupted surfaces of the floors, along with requiring relatively level operating conditions.

The inventor of the present application has previously proposed an IP-SPMT in U.S. Pat. No. 5,379,842 capable of carrying very heavy loads of over 40 tons to address some of the shortcomings of the prior art. In the material-handling equipment of U.S. Pat. No. 5,379,842, a multi-wheeled transport vehicle capable of carrying very heavy loads while crossing uneven terrain without torquing the load was disclosed. The material handling equipment included a modular wheel unit 5 shown in FIG. 1. The modular wheel unit 5 permitted a low profile and included means 7 to equalize the load between a plurality of individual wheel units located in any spacing pattern. The advantages of the transporter disclosed in U.S. Pat. No. 5,379,842 included the ability to offer similar capabilities to that of air bearings of self-loading and omni-directional movement without concern for floor surface textures, severe floor irregularities, or level conditions.

While the capabilities of the transporter disclosed in U.S. Pat. No. 5,379,842 have allowed highly efficient movement of heavy loads of virtually any size, the cost has prevented the technology to be accepted by industries in lower weight capacities, for example to transport loads in the 30 to 50 ton range, and the 10 to 30 ton range. Accordingly, there is a need to have a self-loading capability that can be adapted to lighter, though still unquestionably heavy load ranges that can be more cost acceptable to industry.

SUMMARY

The present disclosure provides the self-loading feature into lighter load ranges by reducing the number of required components in a three-point tricycle type solid configuration providing superior suspension in terms of natural load contact on any type of surface condition. The present disclosure further provides a fluid lifting suspension at each of three points. One point utilizes an on-center rotation fluid suspension axle assembly working in conjunction with solid elastomer tires at each end axle beam at the rear that attaches to the underside of the tricycle transporter platform with heavy fluid cylinder at each end. Accordingly, the three suspension points have the capability of being able to lift and lower to accommodate self-loading.

The processor of the tricycle transporter may include a machine logic controller (PLC) to control each of the wheel drive motors, and the machine logic controller includes steering logic to linearly and rotationally control the tricycle lifting suspension; a steering calculator to perform steering algorithm calculations for the steerable front axle assembly and the fixed rear axle driven wheels, a speed/direction controller to provide command signals to the rear wheel rotations to match with the angularity of the steering axle; and a suspension controller to lift and carry the load, raise and lower the tricycle transporter, establish and maintain a mean travel height.

One of the rear cylinder housing connecting to the tricycle transporter platform may be pivotally mounted on the axle frame and to the underside of the tricycle transporter's load platform by a pair of trunnion pins that allow the cylinders to articulate laterally if and when load leveling is a desirable added feature. Under normal operating conditions all cylinders will raise and lower in unison and the base of the load will simply be parallel to the plane established with the three points of contact on the operating surface.

The second rear axle cylinder will have a fixed mounting to either the underside of the tricycle transporter or the axle while the other end is free to rotate laterally should the leveling feature be activated The suspension controller of the tricycle transporter may control a fluid pressure acting on each of the fluid pistons of each of the three axle suspension points to provide vertical lifting and lowering for the self-loading feature.

The lift circuit of the tricycle transporter may be fitted with one or more pressure transducers.

The electrical compartment of the tricycle transporter may include a shore power connection.

The suspension points of the tricycle transporter may include a fluid pressure transducer, angularity and lift sensors, and wheel speed/direction sensor.

The tricycle transporter may also include a wireless, tethered or embedded operator interface.

An aspect of the present disclosure is the method of electronically differentially driving the independently driven wheels on the rear axle assembly to accurately respond to the angularity of the driven front axle.

It is recognized that the rear axles need not be driven if loads are light enough that the front steerable drive axle has sufficient torque to handle the operating condition.

Additional aspects and/or advantages of the disclosure will be set forth in part in the description which follows and, in part, will be apparent from the description, or may be learned by practice of the disclosure.

According to an aspect of the present disclosure a tricycle transporter includes a frame and a load deck; a machinery compartment, the machinery compartment including a fluid power unit, a processor, and at least one of a combustion engine, a generator, a battery and an external power connection; a single front wheel module; and a dual rear wheel module.

In the tricycle transporter, the single front wheel module may include an axle frame including a cylinder and fluid piston; and first and second wheels connected on opposing sides of the axle frame, each of the wheels being independently driven by a servo motor.

In the tricycle transporter, the dual rear wheel axle assembly may include a beam transversely mounted on an underside of the load deck at a rear portion thereof; a right rear wheel module mounted on a right end of the axle beam; a left rear wheel module mounted on a left end of the axle beam; a right rear fluid cylinder including a fluid piston; and a left rear fluid cylinder including a pneumatic or fluid piston, where the beam is mounted to the underside of the load deck via the right rear fluid cylinder and the left rear fluid cylinder.

In the tricycle transporter, the right rear wheel module may include a right rear wheel positioned on an axle frame formed on a right side of the beam, the right rear wheel being independently driven by a servo motor, and the left rear wheel module may include a left rear wheel positioned on an axle frame formed on a left side of the beam, the left rear wheel being independently driven by a servo motor.

In the tricycle transporter, the processor may include a machine logic controller to control the single front wheel module and the dual rear wheel module, the machine logic controller including a steering mode controller to rotationally control the single front wheel module; a steering calculator to perform steering algorithm calculations for the single front wheel module and the dual rear wheel module; a speed/direction controller to provide command signals to the single front wheel module and the dual rear wheel module; and a suspension controller to lift and carry a load, raise and lower the tricycle transporter, establish and maintain a mean travel height, and to provide sequential load height control.

In the tricycle transporter, the load height controller may increase or decrease fluid pressure to the fluid cylinders of the single front wheel module and the dual rear wheel module as would be used to precision mate the carried load in X, Y, and Z planes with a previously positioned component, the suspension controller may control fluid pressure acting on each of the fluid pistons of the single front wheel module and the dual rear wheel module to provide interaction between the single front wheel module and the dual rear wheel module to if it is desirable for the load to remain level while negotiating angular surfaces along a line of travel of the tricycle transporter.

In the tricycle transporter, the single front wheel module and the dual rear wheel module axle assemblies each may include a fluid pressure transducer, angularity and lift sensors and wheel speed/direction sensors.

The tricycle transporter may further include a wireless, tethered or embedded operator interface.

According to another aspect of the present disclosure, a tricycle transporter includes a frame and a load deck; a machinery compartment, the machinery compartment including a hydraulic power unit, a processor, and at least one of a combustion engine, a generator, a battery and an external power connection. For example, the tricycle transporter may be powered by a plurality of heavy batteries. The tricycle transporter includes a pair of on-center rotation front wheel modules positioned side by side in a transverse direction of the tricycle transporter; and a pair of dual rear wheel axle assemblies positioned consecutively in a longitudinal direction of the tricycle transporter.

BRIEF DESCRIPTION OF THE DRAWINGS

These and/or other aspects and advantages of the disclosure will become apparent and more readily appreciated from the following description of the embodiments, taken in conjunction with the accompanying drawings of which:

FIGS. 1-3 are top, side and end views of a tricycle transporter according to an embodiment of the present disclosure, respectively;

DETAILED DESCRIPTION OF THE PREFERRED EMBODIMENTS

Figure 4:
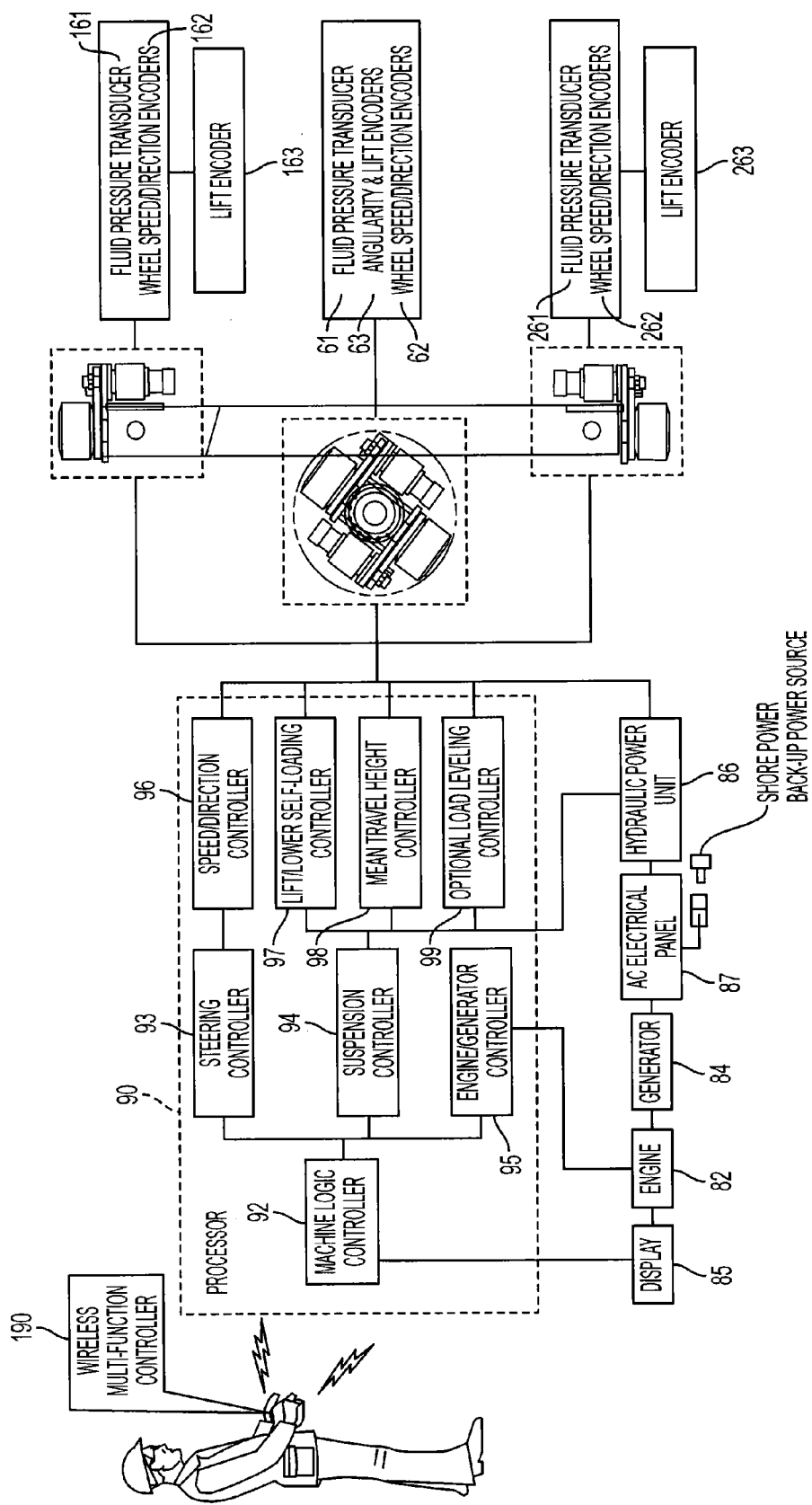
FIG. 4 is a control schematic of the tricycle transporter according to an embodiment of the present disclosure.
Figure 5:
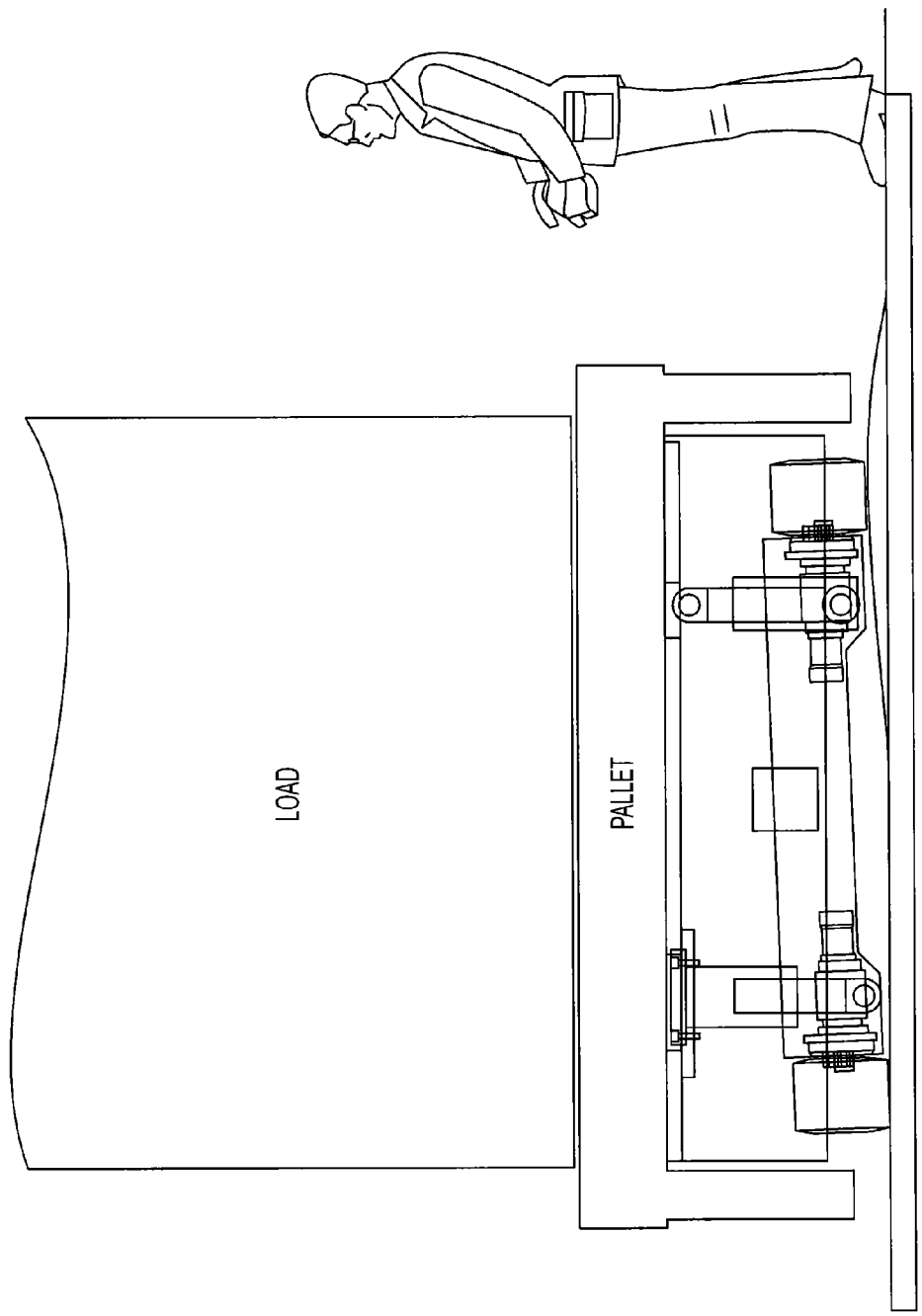
FIG. 5 is an end view of the tricycle transporter carrying a load according an embodiment of the present disclosure.

Reference will now be made in detail to the embodiments of the present disclosure, examples of which are illustrated in the accompanying drawings, wherein like reference numerals refer to the like elements throughout. The embodiments are described below to explain the present disclosure by referring to the figures.

FIGS. 1-3 show a tricycle transporter 10 which includes a frame 11, a machinery compartment 80, a load deck 40, a single front wheel module 20 and a dual rear wheel module 70.

As shown in FIG. 1, the machinery compartment 80 contains a combustion engine 82, generator 84, hydraulic power unit 86 and an electronic controls compartment 88. As an alternative to the combustion engine 82 driven generator 84, shore power or battery power may be connected to the tricycle transporter 10 to power the tricycle transporter 10 through an electrical panel 87 (See FIG. 4). The electronic controls compartment 88 includes an onboard processor 90.

The front wheel module 20 is a multi-directional articulating frame structure where the imposed load is equally transmitted and distributed to the road surface in the broadest possible individual points of contact. The front wheel module 20 connects to the underside of the tricycle transporter 10 at a front center portion of the tricycle transporter by a mounting plate 26. Attached to mounting plate 26 is the top of a center column fluid piston 28. The fluid piston 28 is contained in a fluid cylinder 30 which is trunnion-pin mounted into the open-center axle frame 34 in such a manner as to allow the axle frame to tilt in either direction to accommodate lateral variances in the travel surface. Wheels 22 and 24 are formed on opposing sides of the axle frame 34. Each of the wheels 22 and 24 includes a side plate 36 pivotally mounted on the axle frame 34 by using trunnion pins with heavy low-friction thrust washers. The trunnion pins have a bolted face plate and thrust washer to securely hold the side plates in contact with the open-center axle frame 34. To the side plates 36 are mounted driver axles 42 and 44 supporting the wheels 22 and 24. Also mounted to the side plate are servo motors 46 and 48, of the servo motors 46 and 48 including a gear box. The drive shaft of the respective servo motors 46 and 48 extends through the side plates 36, and are fitted with a sprocket and an encoder that transmits data to the onboard processor 90. Power transmission means from the gear box of the servo motors 46 and 48 to the driver axles 42 and 44 may include a roller chain, timing belt, gear train, or other suitable power transmission means.

While a fluid piston is discussed herein, the present disclosure is not limited to a fluid piston and hydraulic action may be accomplished through other mediums such as a compressed gas as the fluid medium.

On the back of the tricycle transporter 10 is the dual rear wheel module 70. The rear wheel module 70 includes an axle beam 72 transversely mounted on an underside of the load deck 40 of the tricycle transporter 10 at a rear portion thereof and further includes a right rear wheel module 120 and a left rear wheel module 220 mounted on the right and left ends of the axle beam 72, respectively. The axle beam 72 is mounted to the underside of the tricycle transporter 10 via a right rear fluid cylinder 128 including fluid piston 129 and a left rear fluid cylinder 228 including fluid piston 229.

The right rear wheel module 120 includes right rear wheel 122 positioned on an axle frame 134 formed on the right side of the beam 72. The right rear wheel module 120 includes a side plate 136 pivotally mounted on the axle beam 70 using trunnion pins with heavy low-friction thrust washers. The trunnion pins have a bolted face plate and thrust washer to securely hold the side plate in contact with the beam 72. To the side plate 136 is mounted a driver axle 144. Also mounted to the side plate are a servo motor 146 and gear box. The driver axle 144 extends through the side plate 136, and is fitted with a sprocket and an encoder that transmits data to the onboard processor 90. Power transmission means from the gear box of the servo motor 146 to the driver axle 144 may include a roller chain, timing belt, gear train, or other suitable power transmission means.

The left rear wheel module 220 includes left rear wheel 222 positioned on an axle frame 234 formed on the left side of the beam 72. The left rear wheel module 220 includes a side plate 236 pivotally mounted on the beam 70 using trunnion pins with heavy low-friction thrust washers. The trunnion pins have a bolted face plate and thrust washer to securely hold the side plate in contact with the beam 72. To the side plate 236 is mounted a driver axle 244. Also mounted to the side plate are a servo motor 246 and gear box. The driver axle 244 extends through the side plate 236, and is fitted with a sprocket and an encoder that transmits data to the onboard processor 90. Power transmission means from the gear box of the servo motor 246 to the driver axle 244 may include a roller chain, timing belt, gear train, or other suitable power transmission means.

Wheels 22, 24, 122 and 222 are preferably constructed of solid urethane, but may also be constructed of any suitable material.

In order to enable rear fluid equalizing suspension, fluid cylinder 228 is rigidly attached at either the top of the beam 72 while the fluid piston 229 is free to laterally articulate about a suspension pin, while fluid cylinder 128 and fluid piston 129 are both free to articulate laterally through suspension pins.

Fluid pistons 28, 129 and 229 lift and lower in tandem and hold their elevations, thereby providing a self-loading, three-point, rigid suspension. Further, as a manual or automatic load leveling system, fluid pistons 28, 129 and 229 can have the added feature of their lift heights being variable to respond to a solid state load leveling sensor or manually controlled to control pitch, yaw, and roll in the X, Y, and Z planes when mating the carried load with a stationary item. For maintaining a level load condition while traveling on uneven surfaces or handling laterally slanting surfaces, such as moving perpendicular on a ramped surface, fluid cylinder 128 may include an inclinometer device and make stroke corrections for slopes in rare cases where load leveling is desired.

Although the present embodiment shows the right rear wheel 122 and left rear wheel 222 being powered by servo motors 146 and 246, the left and right rear wheel modules could be non-powered and the tricycle transporter 10 could rely only on the front wheel module 20 for tractive effort.

Referring to FIG. 4, a user directs the path of the tricycle transporter 10 through a wireless user interface 190 to direct the path of the tricycle transporter anywhere on the tricycle transporter's 10 X or Y centerlines.

The onboard processor 90 collects and combines information from the encoders of the front wheel module 20 and each of the rear axle wheels 70, to steer the tricycle transporter. As shown in FIG. 4, the encoders for the front wheel module 20 and the dual rear wheel module 70 include fluid pressure transducers 61, 161, 162, wheel speed/direction encoders 62, 162, 262 and lift encoders 63, 163, 263.

The configuration of the tricycle transporter 10 including the front wheel module 20 and the rear fixed direction rear axle wheels 70 provides the capability of tight radial turns.

Control operations of the tricycle transporter 10 take place in the processor 90. Referring to FIG. 4, the processor 90 includes a machine logic controller 92, a steering controller 93, a suspension controller 94, an engine/generator controller 95, a speed/direction controller 96, a lift/lower self-loading controller 97, a mean travel height controller 98 and a load leveling controller 99.

The machine logic controller 92 controls each of the front wheel module 20 and the dual rear wheel module 70. The machine logic controller 92 includes a steering mode controller 93 for angular direction control of the front wheel module 20. The speed/direction controller 96 provides command signals to the front wheel module 20 and the dual rear wheel module 70. The suspension controller 94 includes a lift/lower controller 97 to lift and lower the tricycle transporter 10, a mean travel height controller 98 and a load leveling controller 99, when load leveling is provide as an optional control feature. The engine/generator controller controls the engine 82 and generator 84.

The suspension controller 94 provides interaction between the front wheel module 20 and the dual rear wheel module 70 while negotiating undulating surface irregularities along the line of travel of the tricycle transporter 10. The suspension controller 94 controls the fluid pressure acting on each of the fluid pistons 28, 129 and 229. As previously discussed, the fluid cylinders 30, 128, 228 are pivotally mounted to allow the front wheel module 20 and the dual rear wheel module 70 to articulate or tilt in reaction to laterally uneven surfaces. The fluid pistons 28, 129, 229 and fluid cylinders 30, 128, 229 also provide fluid suspension lift for self-loading. It is contemplated that the only time the suspension control come into play is in the initial lift to the carry/travel position. Essentially, suspension is rigid for all normal travel. The only time to control the lift otherwise is during aligning a load with another object during mating for alignment of bolting or other tasks. The tricycle transporter's 10 loading deck 40 can be lowered to drive under column, stand, or rail supported loads, and the tricycle transporter 10 can then be driven into the resulting portal or tunnel space. Once in position, the fluid pistons 28, 129, 229 of each of the front wheel module 20 and the dual rear wheel module 70 will raise the deck 40 of the tricycle transporter 10 to engage and then lift the load clear of contact with the floor surface. During travel with the load, the fluid pistons 28, 129, 229 are positioned at roughly their mid-stroke point, which allows them to provide the solid suspension function. Specifically, the tricycle transporter 10 is designed to be a nearly rigid suspension except the fluid cylinders in the two steerable front modules are on a common fluid circuit that allows them to freely move oil from one side to the other to accommodate floor irregularities. The same is true of the rear axles They will share oil between the two cylinders on the left and the two cylinders on the right, but the solid point of lift is midpoint between the leading and following axles.

In the case of gas suspension, the cylinders are either at the top or bottom of stroke instead of a mid stroke, but still have shared loading capability.

As discussed, each of the front wheel module 20 and the dual rear wheel module 70 with an array of sensors/encoders including fluid pressure transducers, angularity and lift sensors and wheel speed/direction sensors which are monitored by the processor. It is to be noted that equalizing suspension can also be accomplished by dividing the number of cylinders into a three fluid line interconnected group that will allow free interchange of oil between all of the cylinders. Based on three-point suspension geometry enabled by the structure of the front wheel module 20 and the dual rear wheel module 70, this configuration also assures equalized loading on every axle's surface contact points.

Further, in a liquid suspension, the information obtained from each cylinder's 30, 128, 228 pressure transducer allows the processor 90 to calculate and show on the display 85 (See FIG. 4) the weight and center-of-gravity of the load being carried on a real time basis. In a typical transporter configuration, the load on each cylinder 30, 128, 228, will be monitored by linear position sensors that report to the processor 90 the individual lift height of the fluid pistons 28, 129, 229. This information, along with output from a two-axis inclinometer, can be further used to provide automatic load leveling, if required for the particular application, when the transporter is negotiating ramps or similar surface conditions.

Figure 6:
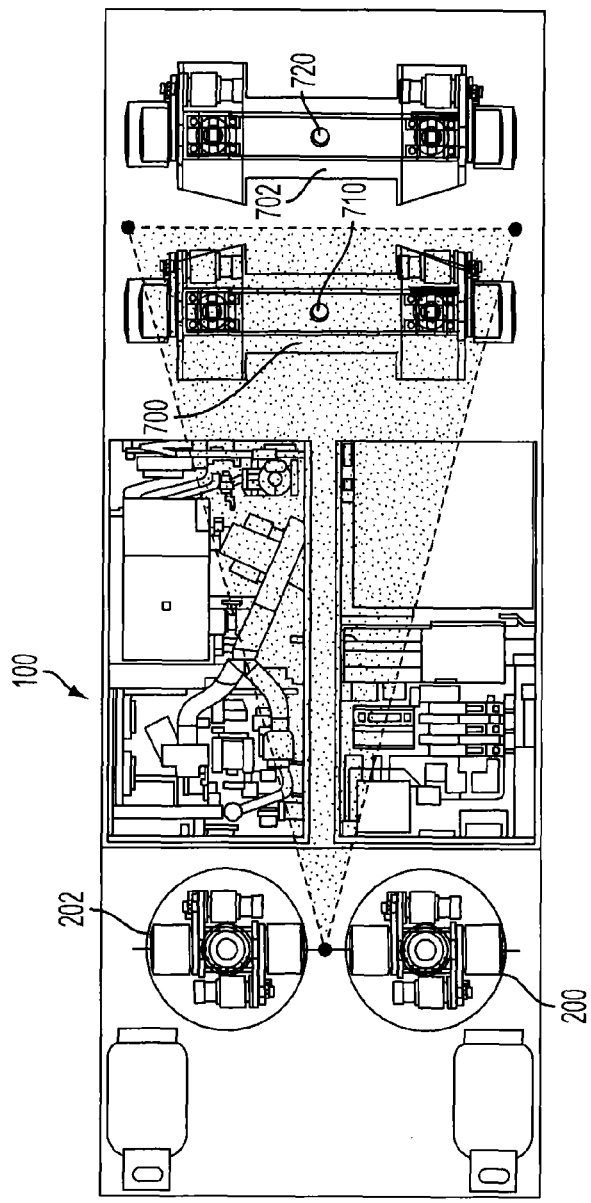
FIGS. 6 and 7 are top and side views of a transporter according to another embodiment of the present disclosure, respectively.
Figure 7:
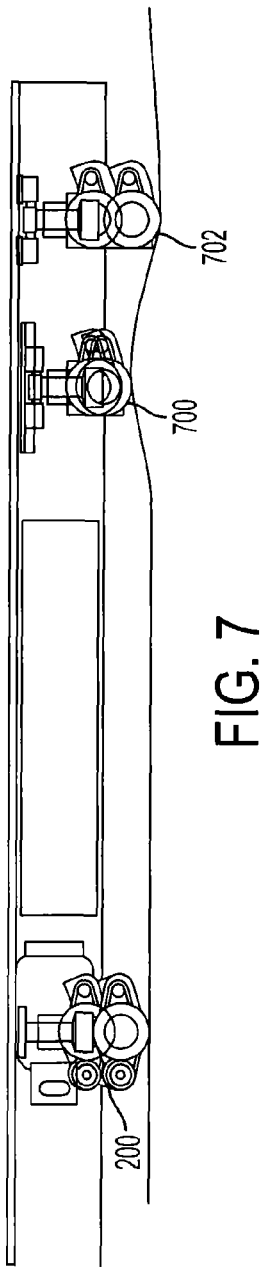

The tricycle transporter 10 shown in FIGS. 1-3 shows a single front wheel module 20 and a single dual rear wheel module 70, the present disclosure is not limited thereto. As shown in FIGS. 6 and 7, a transporter 100 may also include a right front wheel module 200, a left front wheel module 202, and first and second dual rear wheel modules 700 and 702. As the construction of the modules 200, 202, 700 and 702 corresponds to the construction of the modules 20 and 70, respectively, a detailed description thereof is omitted. Further other components of the transporter 100 such as the machinery compartment containing a combustion engine, generator, hydraulic power unit and an electronic controls compartment are the same as the tricycle transporter 10, and a detailed description thereof is omitted.

In the transporter 100 shown in FIGS. 6 and 7, first and second dual rear wheel modules 700 and 702 include pivot pins 710 and 720, respectively, to allow the first and second dual rear wheel modules 700 and 702 to pivot. In view of the pivotal nature of the first and second dual rear wheel modules 700 and 702, the first and second dual rear wheel modules 700 and 702 may also be provided with lubricated skid plates to prevent friction between the first and second dual rear wheel modules 700 and 702 and the underside of the transporter 100.

Figure 8:
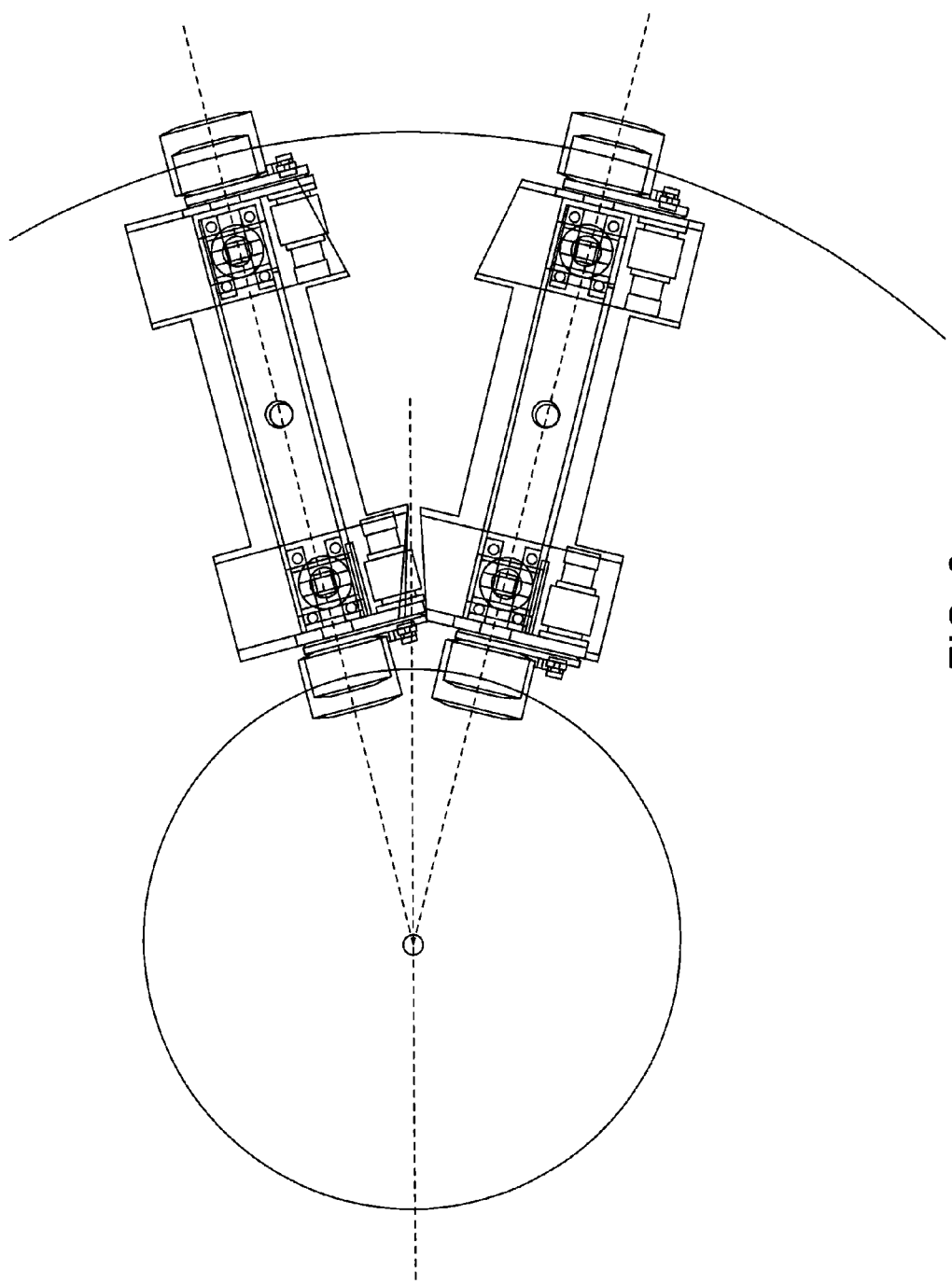
FIGS. 8 and 9 are top views of the transporter performing radial turning according to an embodiment of the present disclosure.
Figure 9:
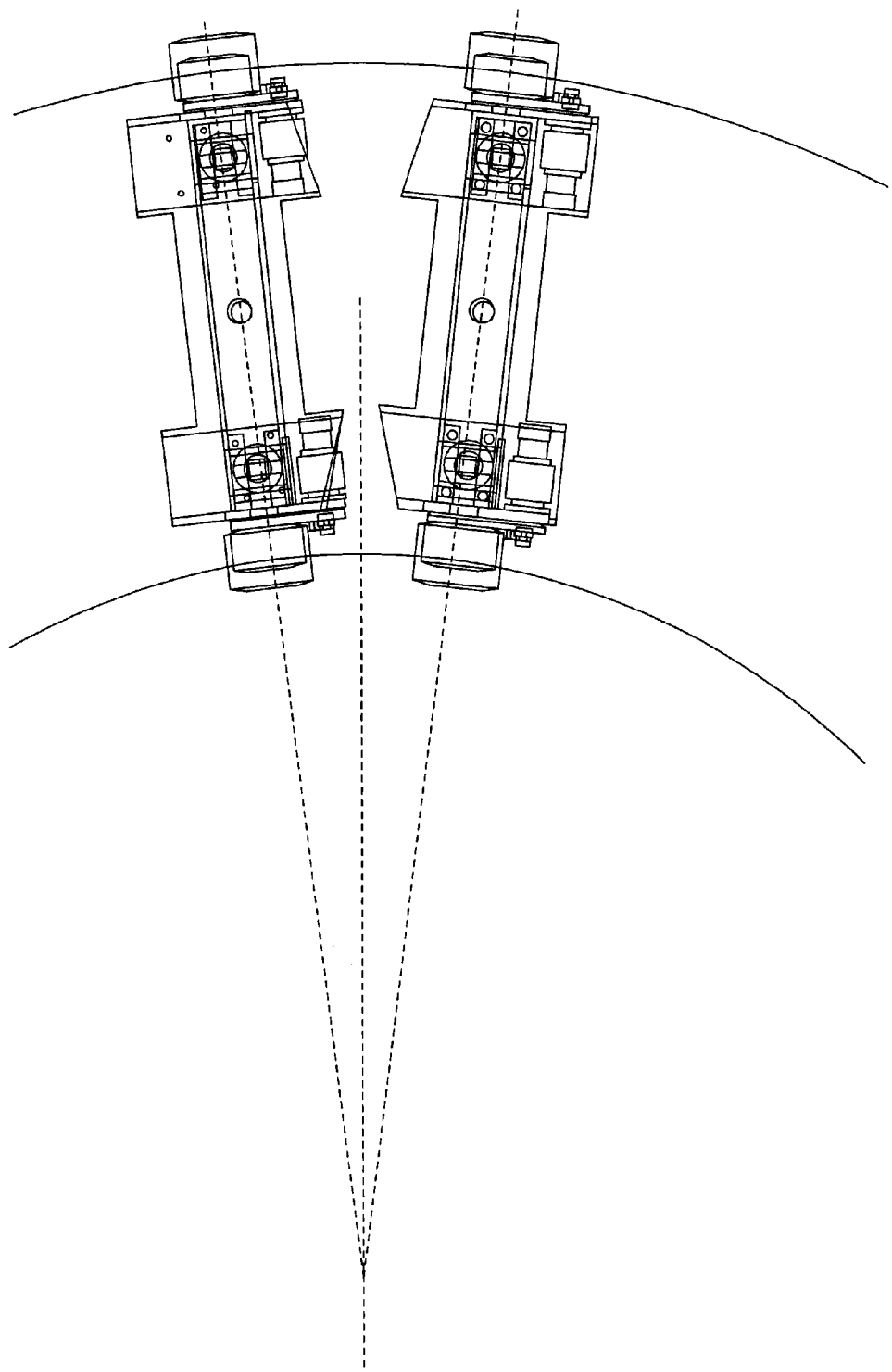

As shown in FIGS. 8 and 9, the configuration of the transporter 100 provides that for both wide and tight radial turns.

Although a few embodiments of the present disclosure have been shown and described, it would be appreciated by those skilled in the art that changes may be made in these embodiments without departing from the principles and spirit of the disclosure, the scope of which is defined in the claims and their equivalents. For example, although the present disclosure discusses a transporter having a single suspension point in the front of the transporter and two suspension points in the rear of the transporter, this may be reversed and the tricycle transporter of the present invention may have two suspension points in the front of the tricycle transporter and one suspension point in the rear of the tricycle and still maintain the capability of being able to lift and lower to accommodate self-loading.

What is claimed is:

1. A tricycle transporter, comprising:
   a frame and a load deck;
   a machinery compartment, the machinery compartment including a hydraulic power unit, a processor, and at least one of a combustion engine, a generator, a battery and an external power connection;
   a single front wheel module positioned at a front portion of the frame below the load deck; and
   a dual rear wheel module positioned at a rear portion of the frame below the load deck,
   wherein the machinery compartment is positioned on the frame below the load deck in between the single front wheel module and the dual rear wheel module.

2. The tricycle transporter according to claim 1, wherein the single front wheel module comprises:
   an on-center rotation axle frame including a cylinder and fluid piston; and
   first and second wheels connected on opposing sides of the axle frame, each of the wheels being independently driven by a servo motor.

3. The tricycle transporter according to claim 2, wherein the dual rear wheel module comprises:
   a beam transversely mounted on an underside of the load deck at a rear portion thereof;
   a right rear wheel module mounted on a right end of the beam;
   a left rear wheel module mounted on a left end of the beam;
   a right rear fluid cylinder including a fluid piston; and
   a left rear fluid cylinder including a fluid piston,
   wherein the beam is mounted to the underside of the load deck via the right rear fluid cylinder and the left rear fluid cylinder to accommodate self loading of the tricycle transporter.

4. The tricycle transporter according to claim 3, wherein the right rear wheel module comprises a right rear wheel positioned on an axle frame formed on a right side of the beam, the right rear wheel being independently driven by a servo motor, and the left rear wheel module comprises a left rear wheel positioned on an axle frame formed on a left side of the beam, the left rear wheel being independently driven by a servo motor.

5. The tricycle transporter according to claim 1, further comprising a wireless, tethered or embedded operator interface.

6. A transporter, comprising:

a frame and a load deck;

a machinery compartment, the machinery compartment including a hydraulic power unit, a processor, and at least one of a combustion engine, a generator, a battery and an external power connection;

a pair of front wheel modules positioned side by side in a transverse direction of the tricycle transporter positioned at a front portion of the frame below the load deck; and a pair of dual rear wheel modules positioned consecutively in a longitudinal direction of the transporter positioned at a rear portion of the frame below the load deck, wherein the machinery compartment is positioned on the frame below the load deck in between the pair of front wheel modules and the pair of dual rear wheel modules.

7. The transporter according to claim 6, wherein each of the pair of single front wheel modules comprises:

an axle frame including a cylinder and fluid piston; and first and second wheels connected on opposing sides of the axle frame, each of the wheels being independently driven by a servo motor.

8. The transporter according to claim 7, wherein each of the pair of dual rear wheel modules comprises:

a beam pivotally mounted by a pivot pin to an underside of the load deck at a rear portion thereof;

a right rear wheel module mounted on a right end of the beam;

a left rear wheel module mounted on a left end of the beam;

a right rear fluid cylinder including a fluid piston; and a left rear fluid cylinder including a fluid piston, the right rear fluid cylinder and the left rear fluid cylinder being positioned between the beam and the underside of the load deck, the underside of the load being provided with lubricated skid plates adjacent to the fluid pistons of the right rear fluid cylinder and the left rear fluid cylinder.

9. The transporter according to claim 8, wherein in each of the pair of dual rear wheel modules, the right rear wheel module comprises a right rear wheel positioned on an axle frame formed on a right side of the beam, the right rear wheel being independently driven by a servo motor, and the left rear wheel module comprises a left rear wheel positioned on an axle frame formed on a left side of the beam, the left rear wheel being independently driven by a servo motor.

10. The transporter according to claim 6, further comprising a wireless, tethered or embedded operator interface.

* * * * *